March 7, 1950  J. D. McKAHIN  2,500,040
TRACTOR MOUNTED CORN BINDER
Filed June 10, 1943  6 Sheets-Sheet 1

Inventor:
John D. McKahin,
By Paul C. Pippel
Attorney.

March 7, 1950

J. D. McKAHIN 2,500,040

TRACTOR MOUNTED CORN BINDER

Filed June 10, 1943

March 7, 1950    J. D. McKAHIN    2,500,040
TRACTOR MOUNTED CORN BINDER

Filed June 10, 1943    6 Sheets-Sheet 4

Inventor.
John D. McKahin,
By Paul O. Pippel
Attorney.

March 7, 1950     J. D. McKAHIN     2,500,040
TRACTOR MOUNTED CORN BINDER
Filed June 10, 1943     6 Sheets-Sheet 6

Inventor:
John D. McKahin,
By Paul O. Pippel
Attorney.

Patented Mar. 7, 1950

2,500,040

UNITED STATES PATENT OFFICE 2,500,040

TRACTOR MOUNTED CORN BINDER

John D. McKahin, Hinsdale, Ill., assignor to International Harvester Company, a corporation of New Jersey Application June 10, 1943, Serial No. 490,265

11 Claims. (Cl. 56—15)

This invention relates to an implement construction. It also relates to a support and mounting of an implement as well as to driving means therefor. More specifically, it relates to the arrangement of the implement with respect to the tractor in mounted position.

Various harvesting machines have been mounted upon a tractor, but it is thought to be novel to mount a corn binder upon a tractor. Heretofore, corn binders have been connected to tractors either in trail-behind relationship or at the side thereof. The fact that it may be difficult to arrange the parts of a corn binder in tractor-mounted position within the wheel line thereof with respect to a tractor and to raise the binder to tractor-mounted position may have stood in the way of mounting the corn binder upon the tractor. As concerns other implements, it is difficult to mount such implements upon a tractor, because the mounting operation normally requires a lifting of the implements, and this may be difficult if the implements are heavy.

An object of the present invention is to provide an improved corn binder.

A further object is the provision of an improvement in a tractor-mounted implement.

Another object is the provision of an improved means for lifting an implement to mounted position upon a mobile carrying frame.

Another object is to provide improved means for lifting an implement to mounted position upon a tractor by means of tractor power.

A still further object is the provision of means for lifting an implement to mounted position upon a tractor, in which position the implement is to operate with the tractor running forwardly.

Still another object is to provide a mounting for an implement upon a tractor, the mounting involving structure passing beneath the tractor axle.

A further object is to provide a mode of lifting an implement into position upon a tractor, in which position supporting structure of the implement passes beneath the tractor axle.

A further object is the provision of a novel drive arrangement for a tractor-mounted implement.

Another object is to provide a novel means for mounting a conveyer on a supporting structure.

Still another object is the provision of an improved mode for mounting a conveyer on a tractor.

Other objects will appear from the disclosure.

According to the present invention, a corn binder is mounted upon a tractor between the tractor body and the wheel line, cutting means and binding means being forward of the axle, a conveyer being rearward of the axle, and supporting structure passing beneath the axle.

Figure 1:
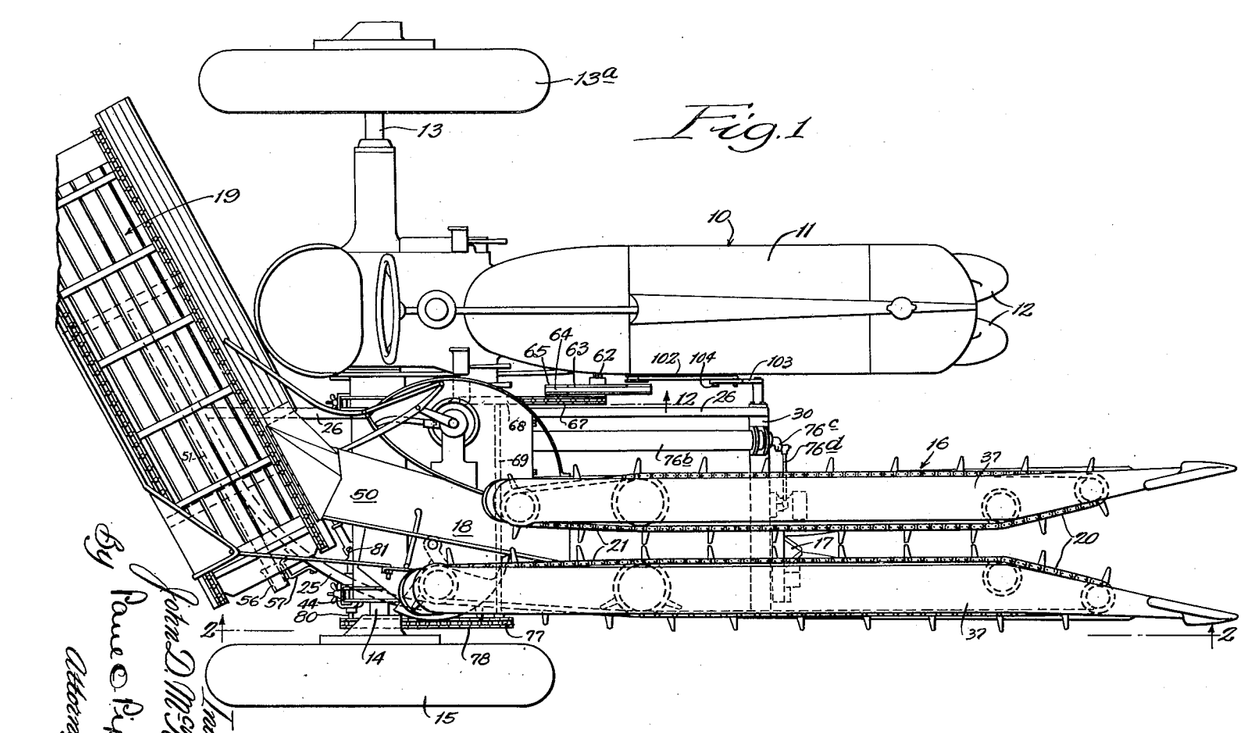
Figure 1 is a plan view of a tractor and a corn binder mounted thereon in the novel manner of the present invention.
Figures 2, 3:
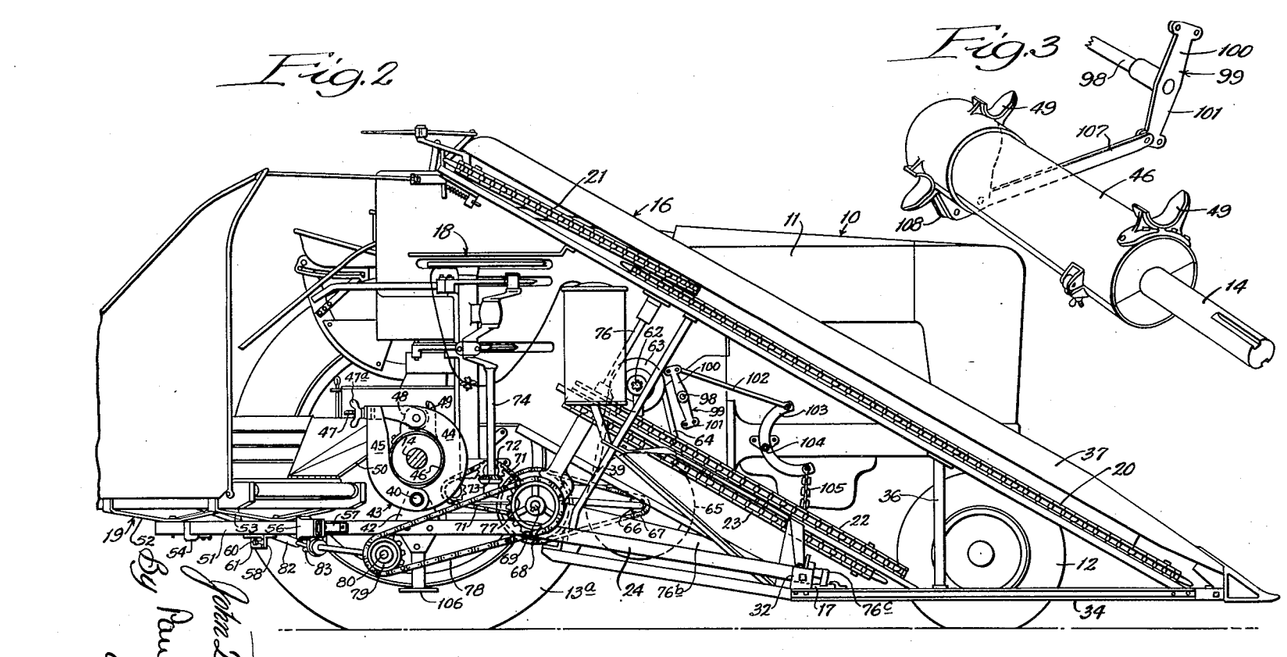
Figure 2 is a side elevational view with the rear wheel removed and the axle in section of the corn binder and tractor of Figure 1.
Figure 3 is an enlarged perspective view showing lifting means and actuating parts therefor.

The reference character 10 designates a tractor having a narrow, longitudinally extending body 11, a narrow front rolling support 12, a short left-hand rear axle 13, a wheel 13ª connected to the axle 13, a long right-hand rear axle 14, and a wheel 15 connected to the long axle 14 in spaced relation to the tractor body 11 and determining a wheel line spaced from the tractor body. Mounted upon the tractor 10 is an implement in the form of a corn binder 16 having a cutting means 17 positioned well forward of the axle 14 and between the wheel line and the tractor body 11. The corn binder also includes a binding means 18 between the wheel 15 and the tractor body 11 and almost over the rear axle 14. A conveyer 19 is positioned at the rear of the tractor and extends transversely thereof and slightly longitudinally. The binder also includes a forward pair of upper guide chains 20, a rearward pair of upper guide chains 21, and lower guide chains 22 and 23. The guide chains form a throat that guides a row of corn stalks to the cutting means 17 and then lifts the cut stalks to the binding means 18, which binds the stalks into bundles and discharges the bundles rearwardly over the axle 14 to the conveyer 19, which conveys them transversely of the tractor 10 and discharges them at the left-hand side thereof.

Figure 4:
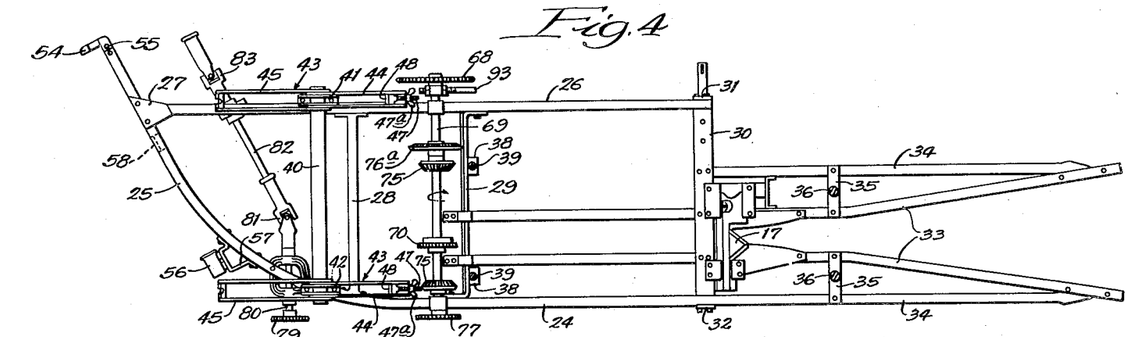
Figure 4 is a plan view of the supporting structure of the corn binder.
Figures 5, 6:
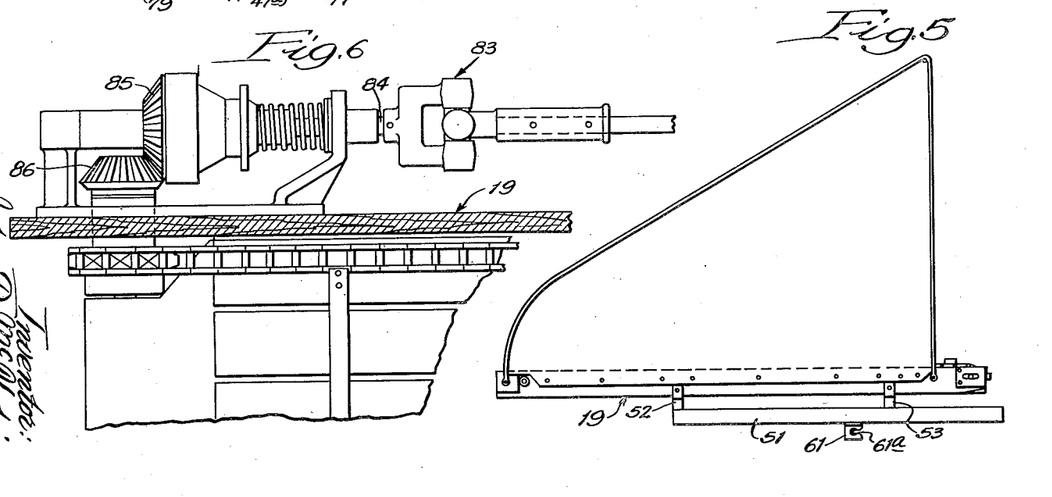
Figure 5 is a rear elevational view of a corn binder showing the conveyer thereof.
Figure 6 is a detail view showing drive means for the conveyer.

The supporting structure for the corn binder is shown in Figure 4. This includes an outer longitudinal member 24 having a rear portion 25 inclined to the remainder of the member. There is also included an inner longitudinal member 26 secured to the rear portion 25 of the outer member 24 by a plate 27. The forward portions of the members 24 and 26 are maintained in spaced relation by a brace 28 and a brace 29 and a front transverse member 30 secured to the members 24 and 26 by means of flanged ends 31 and 32. Extending forwardly from the front transverse member 30 are diverging throat-forming members 33 that are braced by longitudinal pieces 34 extending from the front ends of the throat-forming members 33 to the front transverse member 30. The transverse member 30 and the throat-forming members 33 provide a support for the cutting means 17. Transverse pieces 35 extend between the throat-forming members 33 and the braces 34 and support the lower ends of uprights 36 that extend upwardly to provide support for the lower middle portion of spaced inclined crop gathering structures 37 upon which the guide chains 20 are slidably mounted. Brackets 38 secured to the transverse brace 29 support the lower end of uprights 39 providing support for the upper ends of the inclined structures 37. A transverse pipe 40 is mounted in brackets 41 and 42 secured respectively to the longitudinal members 26 and 24. Pivotally connected to the pipe 40 are clamps 43 formed in halves 44 and 45, which embrace a sleeve 46 surrounding the right-hand axle 14 and provide a mounting for the corn binder 16 upon the axle 14. The halves 44 and 45 of the clamps 43 are secured to one another in embracing relation about the sleeve 46, by means of clamping bolts and nuts 47 and 47ª. The halves 44 of the clamps 43 carry rollers 48, which rest in lifting members 49 of hook form secured to the sleeve 46. Extending across the axle 14 and the sleeve 46 surrounding it is a pan 50 over which bundles discharged from the binding means 18 move onto the conveyer 19.

Figures 7, 10, 11:
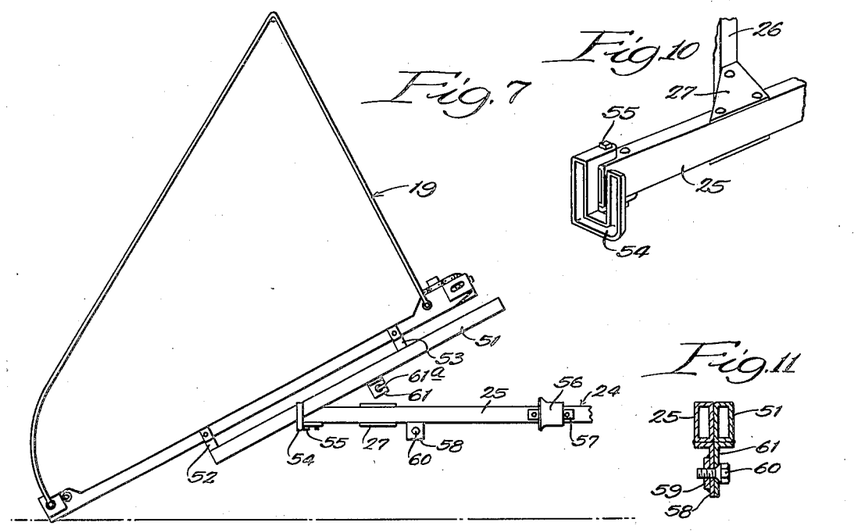
Figures 7, 8, and 9 show successive stages in the mounting of the conveyer.
Figure 10 is a detail view in perspective showing the rear end of the supporting structure of the corn binder, upon which structure the conveyer is mounted.
Figure 11 is a sectional view taken along the line 11 of Figure 9.
Figure 8:
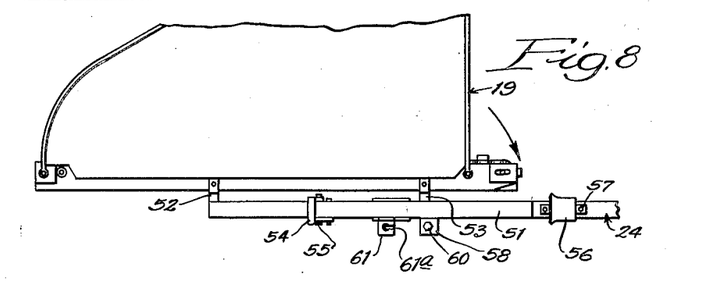
Figure 9:
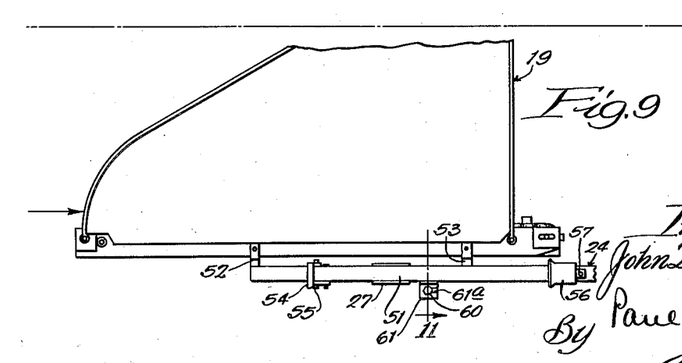

The conveyer 19 has secured to its under side an elongated element 51 by means of connections 52 and 53. The elongated element 51 rests in receiving means formed as a U-shaped member 54 open at the top pivotally connected by a bolt 55 to the end of the rear portion 25 of the longitudinal member 24. A horizontally disposed socket 56 is secured by a bracket 57 to the longitudinal member 24. The socket 56 receives the end of the elongated element 51. A depending angle member 58 is secured to the under side of the portion 25 of the longitudinal member 24 and carries a reinforcement 59. A latch element in the form of a bolt 60 is threaded through the angle member 58 and the reinforcement 59. A depending angle member 61 secured to the under side of the elongated element 51 has a slot 61ª through which the bolt 60 extends to maintain the conveyer 19 mounted upon the rear end of the portion 25 of the longitudinal member 24.

In operation, the tractor 10 and the corn binder 16 mounted thereon are driven along a row of standing corn stalks passing between the tractor wheel 15 and the tractor body 11 and between the gathering structures 37. The chains 20, 22, and 23 guide the stalks to the cutting means 17, and the chains pass the cut stalks to the binding means 18 where they are bound into bundles. The bundles are discharged upon the inclined pan 50 and move to the conveyer 19, which conveys them transversely and discharges them at the left side of the rear of the tractor 10. The binding means 18 is not shown in detail, since it forms no part of the present invention. The important thing as far as the description has gone is the arrangement of the binder 18 with respect to the tractor 10 in mounted position of the binder. Cutting means 17 is well forward of the rear axle 14 and between the tractor wheel line and the body 11, and the binding means is adjacent the rear axle 14 between the wheel line and the tractor body 11 and somewhat above the axle 14. It is believed to be novel to mount a corn binder upon a tractor and to mount it within the tractor wheel line so that the binder operates upon a row of stalks directly alongside the tractor body and passes the bound stalks over the tractor axle. Furthermore, it is novel to position the supporting structure of the binder beneath the tractor axle. Also, it is new to provide a pivot for the binder directly below the tractor axle.

The driving mechanism for the binder 18 will now be described. A power take-off shaft 62 extends transversely from the right side of the tractor body 11 and has splined thereon a pulley 63. The pulley 63 drives a belt 64 which in turn drives a pulley 65 having a sprocket 66 secured thereto. The sprocket 66 drives a sprocket chain 67 that in turn drives a sprocket 68 secured to a transverse shaft 69 mounted upon the corn binder framework, as shown in Figure 4. Secured to the shaft 69 is a sprocket 70 that drives a chain 71 adapted to drive a bevel gear 72 shown in Figure 2. The bevel gear 72 is in driving engagement with a bevel gear 73 secured to and driving a vertical shaft 74. The shaft 74 drives the binding mechanism not otherwise shown. A pair of bevel gears 75 secured to the shaft 69 are adapted to operate with conventional gearing shafts 76, of which only one is shown, driving the chains 20, 21, 22, and 23. A bevel gear 76ª secured to the shaft 69 illustrates part of a conventional mechanism for driving a forwardly extending torque tube 76ᵇ. A crank 76ᶜ secured to the front end of the torque tube 76ᵇ is connected by a connecting rod 76ᵈ with cutting means 17 so as to drive the same. Secured to the shaft 69 is a sprocket 77 driving a chain 78 in turn driving a sprocket 79 secured to a shaft 80. The shaft 80 is connected in a universal joint 81 with a telescopic shaft 82 connected in turn by a universal joint 83 with a shaft 84 upon which a bevel gear 85 is secured. The bevel gear 85 meshes with a bevel gear 86 constructed for driving the conveyer 19.

Figures 12, 13, 14:
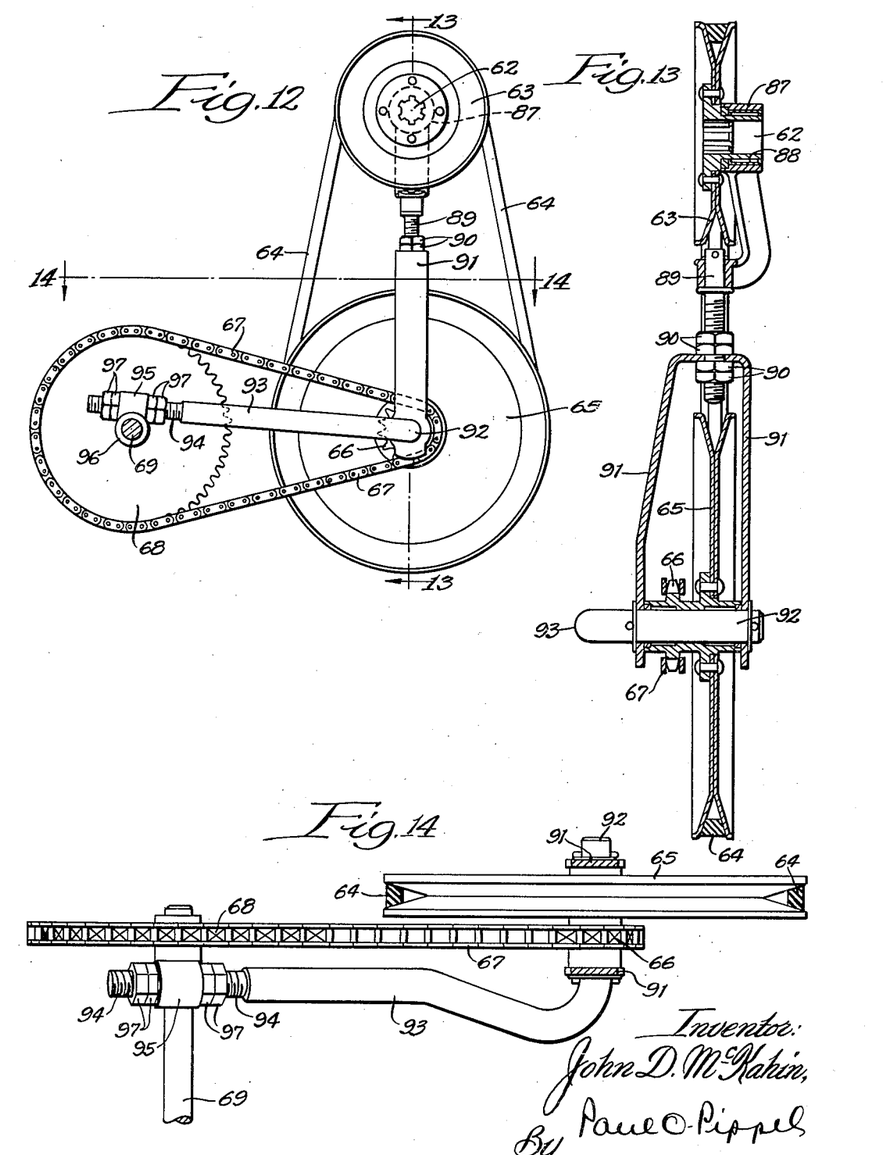
Figure 12 is a sectional view on a greatly enlarged scale taken on the line 12 of Figure 1.
Figure 13 is a sectional view on a slightly larger scale taken on the line 13—13 of Figure 12.
Figure 14 is a sectional view on a slightly larger scale taken on the line 14—14 of Figure 12.

The corn binder 16 pivots with respect to the tractor about the tube 40 positioned beneath the tractor axle 14. Since the tube 40 is displaced both from the transverse drive shaft 69 on the binder framework and the power take-off shaft 62, pivoting of the corn binder 16 about the shaft 40 causes a change in the distance between the transverse shaft 69 and the power take-off shaft 62. Compensation for this change in distance is provided in the means shown in Figures 12, 13, and 14. As seen in Figure 13, a bracket 87 is mounted on bearings 88 on the power take-off shaft 62. The bracket 87 supports a depending bolt 89 to which are threaded lock nuts 90 which affix a support 91 to the bolt 89. The support 91 carries a bent end portion 92 of a rod 93. The pulley 65 and the sprockets 66 secured thereto are rotatably mounted upon the bent end 92. The rod 93 has a threaded end 94 receiving a boss 95 of a collar 96 mounted upon the transverse shaft 69. Lock nuts 97 fix the collar 96 to the threaded portion 94 of the rod 93. The rod 93 may be considered as one link, and the bracket 87, the bolt 89, and the support 91 may be considered a second link of a pair of links forming an articulated connection between the transverse shaft 69 and the power take-off shaft 62. The angle between these links may change with adjustment of the binder 17 upon the tractor 10, but the driving connection between the power take-off shaft 62 and the transverse shaft 69 will be maintained, since it is transmitted through the pulley 65 and the sprocket 66 mounted upon the pivotal connection between the two links, namely, the bent end 92. The binder 18 is adjustable with respect to the tractor by the power of the tractor acting through an oscillating shaft 98. The shaft 98 is a transverse rockable shaft forming a part of a conventional power lift mechanism operable by power from the engine under the control of the operator. The United States Patent 2,039,316, May 5, 1936, shows a power lift shaft of this type. To the shaft 98 is secured a member 99 having an upper arm 100 and a lower arm 101. A link 102 connects the upper arm 100 with a curved bell-crank 103 pivoted at 104 on the tractor body 11. A chain 105 connects the other arm of the bell-crank 103 with a forward point 105ᵃ of the binder 18. Angular movement of the shaft 98 in either one direction or the other will raise or lower the binder 18.

Figure 15:
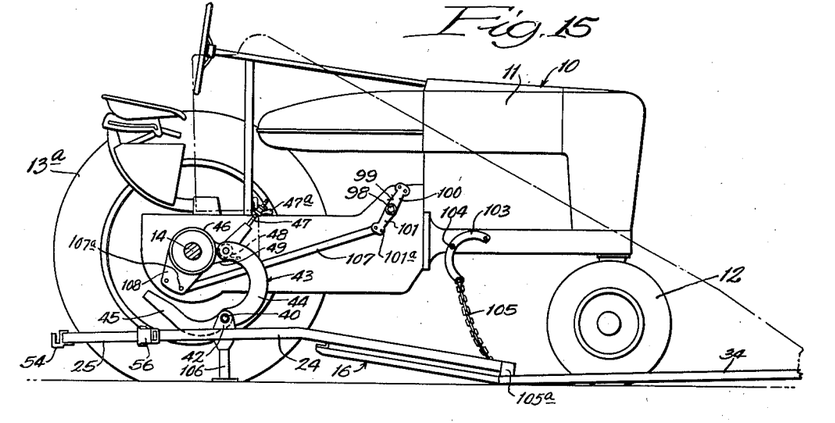
Figure 15 is a side view on a somewhat smaller scale than Fig. 1 with parts removed showing the tractor and the corn binder detached from the tractor, but in position to be raised to mounted position upon the tractor.
Figure 16:
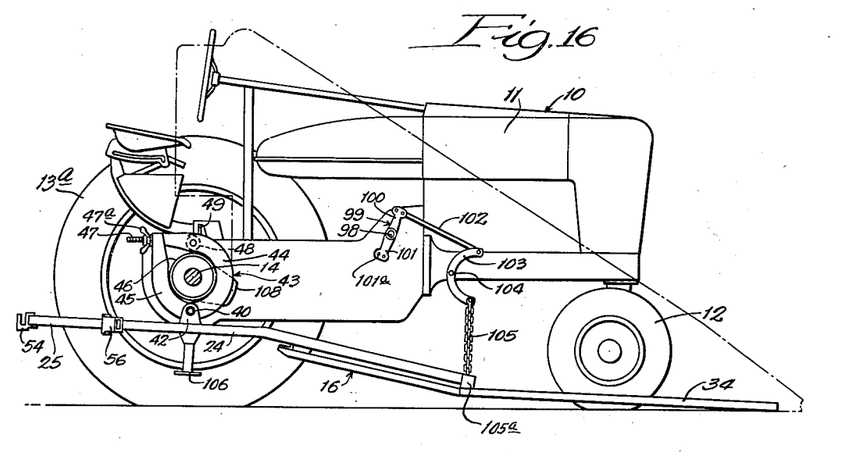
Figure 16 is a similar side view on the same scale as Fig. 15 showing one end of the corn binder raised to mounted position upon the tractor.

Figure 15 shows the corn binder 18 detached from the tractor and resting upon the ground upon its forward end and upon feet 106 secured to and depending from the longitudinal members 24 and 26. The conveyer 19 has been removed. For attachment of the corn binder to the tractor 10, the tractor is driven into the position shown with respect to the corn binder in Figure 15. The binder framework including the members 24 and 26 passes beneath the tractor axle 14. The rollers 48 mounted on the halves 44 of the clamps 43 are engaged by lifting members 49 on the sleeve 46. A link 107 is connected at 101ᵃ to the lower arm 101 of the member 99 and at 107ᵃ to a depending flange 108 upon the sleeve 42. A counter-clockwise movement of the shaft 98 on the arm 101 acts through the link 107 and the flange 108 to effect a counter-clockwise movement of the sleeve 46 and the lifting members 49 secured thereon. This causes the rollers 48 and the rear end of the corn binder 18 to be raised to the position shown in Figure 16. The mounting of the sleeve 46 upon the tractor axle 14 is more fully shown and claimed in the Patent No. 2,376,539, which forms per se no part of the present invention. After the rear end of the corn binder has been raised in the position of Figure 16, the sleeve 46 is locked to the axle 14 by means not shown here but shown completely in the aforementioned copending application of Hitchcock et al., and the link 107 is disconnected from the flange 108 and the arm 101 on the member 99. Then the link 102 is connected to the upper arm 100 on the member 99, and angular movement of the shaft 98 raises the forward end of the corn binder 18 about the tube 40 as an access to the height desired.

Then the conveyer 19 is mounted upon the rear end of the supporting framework for the binder in the novel manner shown in Figures 7 to 11, inclusive. First, as shown in Figure 7, one end of the conveyer is raised so that a portion of the elongated element 51 journaling opposite a mid-point of the conveyer 19 may be placed in the U-shaped member 54. Then the elevated end of the conveyer 19 is forcibly depressed to bring the elongated element down to the rear end 25 of the longitudinal member 24. Then the conveyer 19 and the elongated element 51 are slid along the rear end 25 until the end of the elongated element 51 is inserted within the horizontally disposed socket 56, and the slot 61ᵃ on the angle member 61 depending from the elongated element 51 engages the bolt 60 secured in the angle member depending from the rear end 25. The bolt 60 is tightened to prevent sliding of the elongated element 51 out of the socket 56. This mode of mounting the conveyer 19 upon the rear end 25 of the longitudinal member 24 is believed to be new and novel. The U-shaped member 54 and the horizontally disposed socket 56 make this mode of mounting possible. The bolt 55 provides a vertical pivot for the U-shaped member 54 upon the rear end 25 so that the elongated element 51 may be received in the U-shaped member 54 even though the elongated element 51 is not originally parallel to the rear end 25.

For dismounting of the corn binder 18 from the tractor 10, the operations just described are carried out in transverse order. The bolt 60 is loosened, and the conveyer 19 and the elongated element 51 are slid toward the left along the end 25 to disengage the end of the elongated element 51 from the socket 56. The left end of the conveyer 19 is lowered to the ground, and the elongated element is lifted out of the U-shaped member 54. The elevated right end of the conveyer 19 is lowered to the ground. Then the forward end of the corn binder 18 is lowered to the ground by angular movement of the shaft 98. The link 102 is disconnected from the member arm 100 and the bell-crank 103. The link 107 is connected to the lower arm 101 and the depending flange 108 on the sleeve 46, and the shaft 98 is moved angularly to lower the lifting members 49 to the position of Figure 15. This lowers the rear end of the binder 18 until the feet 106 touch the ground and the tractor 10 is backed away from the binder 16.

It will be apparent from the foregoing description that the application has disclosed a new and novel arrangement of a corn binder mounted upon a tractor, a novel driving means for the corn binder, and a novel manner of lifting the corn binder into mounted position on the tractor. The mounting of a corn binder upon a tractor is novel, and more particularly the mounting of the corn binder within the wheel line of the tractor is novel. Beyond this it is novel to arrange the binding means with respect to the tractor so that bundles of cut stalks are passed rearwardly over the tractor axle to the conveyer at the rear thereof. Another point of novelty is the mounting of the binder upon the tractor by means of structure that passes beneath the tractor axle. Since the structure passes beneath the tractor axle, removal of the binder is facilitated. It is also novel to provide a pivot for the binder directly below the tractor axle.

It is novel to lift a binder from a detached position in which it rests upon the ground to a mounted position upon a mobile supporting frame. More specifically, it is novel to mount a binder in this way upon a tractor and to do this by means of tractor power. It is also novel to raise a binder to mounted position upon a mobile supporting frame by lifting means on the mobile supporting frame acting to lift just one end of the binder. This mode of lifting as applied to implements broadly is claimed in the aforementioned Hitchcock et al. application. Certain aspects of this mode of lifting, namely, this manner of lifting as applied to implements extending beneath a tractor axle in mounted position, are claimed in the copending application of George Slavicek, Serial No. 490,270, filed June 10, 1943, now abandoned.

Another novel feature of the invention is the mounting of the conveyer in raised position upon a supporting structure in the manner shown.

The invention is to limit the invention only within the scope of the appended claims.

What is claimed is:

1. In combination, a tractor having a body, an axle, and a wheel on the axle spaced from the body; crop-gathering means mounted on the tractor at the same side as the wheel, said crop gathering means being positioned between the wheel and the body; and crop-binding means mounted on the tractor between the wheel and the body higher than the axle for binding crops gathered by the gathering means into bundles of crops, said crop-binding means being adapted to discharge said bundles of crops over the axle to the rear thereof.

2. In combination, a tractor having a body, an axle and a wheel on the axle spaced from the body so as to determine a wheel line spaced from the body; crop-gathering means positioned between the wheel line and the body well forward of the axle so as to gather from a row of crops alongside the tractor body; means mounting the crop-gathering means on the tractor; crop-binding means positioned between the wheel line and the body adjacent the axle so as to bind crops received from the crop-gathering means, said crop-binding means being adapted to pass the bundles of crops rearwardly of the axle; means mounting the crop-binding means on the tractor; a bundle conveyor extending transversely of the tractor at the rear thereof for receiving bundles from the crop-binding means and conveying them rearwardly of the tractor; and means mounting the bundle conveyor on the tractor.

3. In combination, a tractor having a body, an axle, and a wheel on the axle spaced from the body so as to determine a wheel line spaced from the body; crop-gathering means positioned between the wheel line and the body well forward of the axle so as to gather from a row of crops alongside the tractor body; means mounting the crop-gathering means on the tractor; crop-binding means positioned between the wheel line and the body higher than the axle, said crop-binding means being adapted to pass bundles of crops over the axle to the rear thereof; means mounting the crop-binding means on the tractor; a bundle conveyor extending transversely of the tractor at the rear thereof for receiving bundles of crops from the crop-binding means and conveying them rearwardly of the tractor; and means mounting the bundle conveyor on the tractor.

4. In combination, a tractor having a body, an axle, and a wheel on the axle spaced from the body; a framework extending along the tractor body between the body and the wheel beneath the tractor axle from in front of the axle to the rear thereof; means connecting the framework to the axle; crop-gathering means positioned adjacent the tractor body forward of the axle; means mounting the crop-gathering means on the tractor; crop-binding means positioned between the wheel and the body adjacent the axle; means mounting the crop-binding means on the framework; a bundle conveyor positioned at the rear of the tractor rearwardly of the crop-binding means; and means mounting the bundle conveyor on the framework.

5. In combination, a tractor having a body, an axle, and a wheel on the axle spaced from the body; a framework extending along the tractor body between the body and the wheel beneath the tractor axle from in front of the axle to the rear thereof; crop-gathering means positioned adjacent the tractor body forward of the axle; means mounting the crop-gathering means on the tractor; crop-binding means positioned between the wheel and the body adjacent the axle; means mounting the crop-binding means on the framework; a bundle conveyor positioned at the rear of the tractor rearwardly of the crop-binding means; means mounting the bundle conveyor on the framework; and means pivotally connecting the framework to the axle on an axis beneath the axle for adjusting the crop-gathering means, crop-binding means, and bundle conveyor with respect to the tractor.

6. In combination, a tractor; crop-gathering means; means mounting the crop-gathering means on the tractor; conveyor-supporting means mounted on the tractor; a conveyor; and means for mounting the conveyor on the conveyor-supporting means free of the ground to enable the conveyor to receive crops from the crop-gathering means, said means comprising a fulcrum means positioned on the conveyor-supporting means and a latch element carried by said conveyor-supporting means horizontally spaced from said fulcrum means; a slotted element carried by the conveyor, said conveyor having a portion engageable with the fulcrum means and pivotal thereon whereby said conveyor may be tilted from an inclined position with respect to the ground to a substantially horizontal position on the conveyor-supporting means, said conveyor being slidable horizontally on said fulcrum means whereby said latch element engages said slotted element in securing relation.

7. In combination, a tractor; crop-gathering means; means mounting the crop-gathering means on the tractor; conveyor-supporting means mounted on the tractor including a horizontal beam elevated from the ground; a conveyor; and means for mounting the conveyor on the conveyor-supporting means in elevated position to enable the conveyor to receive crops from the crop-gathering means, said means including fulcrum means positioned at one of the beam and a horizontally projecting latch element positioned on the beam in spaced relation to the fulcrum means; a slotted element positioned on the conveyor, said conveyor having a portion engageable with the fulcrum means and pivotal thereon whereby said conveyor may be tilted from an inclined position with respect to the ground to a substantially horizontal position on the beam, said conveyor being slidable horizontally on said fulcrum means whereby said latch element engages said slotted element in securing relation.

8. In combination, a tractor having a body, an axle, and a wheel on the axle spaced from the body determining a wheel line spaced from the body; crop-gathering means positioned adjacent the body within the wheel line forward of the axle; a supporting structure passing within the wheel line beneath the tractor axle from in front thereof to the rear thereof; means connecting the supporting structure to the tractor axle; means mounting the crop-gathering means on the supporting structure forward of the axle; a conveyor; and means for mounting the conveyor on the supporting structure rearward of the tractor axle to enable the conveyor to receive crops from the crop-gathering means, said means comprising a fulcrum means positioned on the rear end of the supporting structure and horizontally projecting latch means positioned on the supporting structure between the fulcrum means and the axle; a slotted element carried by the conveyor; said conveyor having a portion engageable with the fulcrum means and pivotal thereon whereby said conveyor may be tilted from an inclined position with respect to the ground to a substantially horizontal position on the supporting structure, said conveyor being relatively moveable with respect to said supporting structure on said fulcrum means whereby said latch means engages said slotted element in securing relation.

9. In combination, a tractor having a body, an axle, and a wheel on the axle spaced from the body so as to determine a wheel line spaced from the body; a device comprising crop-gathering means positioned between the wheel line and the body well forward of the axle so as to gather a row of crops alongside the tractor body; crop-binding means positioned between the wheel line and the body adjacent the axle adapted to receive crops from the crop-gathering means and to pass the crops rearwardly of the axle; means mounting the crop-binding means on the tractor; and a bundle conveyor extending transversely of the tractor at the rear thereof for receiving crops from the crop-binding means and conveying them rearwardly of the tractor; and means pivotally mounting the device on a pivot axis beneath the tractor axle.

10. In combination, a tractor having a body, an axle, and a wheel on the axle spaced from the body so as to determine a wheel line spaced from the body; a device comprising crop gathering means positioned between the wheel line and the body well forward of the axle so as to gather a row of crops alongside the tractor body and crop-binding means positioned between the wheel line and the body higher than the axle adapted to receive crops from the crop-gathering means and to pass bundles of crops over the axle to the rear thereof; and a bundle conveyor extending transversely of the tractor at the rear thereof for receiving bundles from the crop-binding means and conveying them rearwardly of the tractor; and means pivotally mounting the device on the tractor on an axis beneath the tractor axle.

11. In combination, a tractor having a body, an axle, and a wheel on the body spaced from the axle so as to determine a wheel line spaced from the body; cutting means positioned well forward of the tractor body for cutting a row of stalks, said cutting means being positioned between the wheel line and the tractor body; means mounting the cutting means on the tractor; binding means positioned between the wheel line and the tractor body higher than and somewhat forward of the tractor axle for receiving cut stalks, said binding means being adapted to pass the stalks over the tractor axle to the rear thereof; and means mounting the binding means on the tractor.

JOHN D. McKAHIN.

REFERENCES CITED

The following references are of record in the file of this patent:

UNITED STATES PATENTS

| Number | Name | Date |
|---|---|---|
| 640,046 | Stone | Dec. 26, 1899 |
| 793,801 | Pallady | July 4, 1905 |
| 943,090 | Macphail | Dec. 14, 1909 |
| 1,063,967 | Gilson | June 10, 1913 |
| 1,443,548 | Ray | Jan. 30, 1923 |
| 1,736,897 | Zumwalt | Nov. 26, 1929 |
| 1,828,844 | Metcalf | Oct. 27, 1931 |
| 2,062,582 | Kowalsky | Dec. 1, 1936 |
| 2,196,025 | Paradise et al. | Apr. 2, 1940 |
| 2,215,554 | Logan | Sept. 24, 1940 |
| 2,259,893 | Hyman | Oct. 21, 1941 |
| 2,376,541 | Johnson et al. | May 22, 1945 |